US005971459A

United States Patent [19]
Gauthier

[11] Patent Number: 5,971,459

[45] Date of Patent: Oct. 26, 1999

[54] CAMPER EXTENSION

[76] Inventor: Gaston Gauthier, 534 Rowcliffe Avenue, Kelowna, British Columbia, Canada, V1Y 5Y9

[21] Appl. No.: 09/140,728

[22] Filed: Aug. 27, 1998

Related U.S. Application Data

[60] Provisional application No. 60/056,266, Aug. 29, 1997.

[51] Int. Cl.[6] .......... B62C 1/05

[52] U.S. Cl. .......... 296/26.1; 296/26.08; 296/26.11

[58] Field of Search .......... 296/26.1, 26.08, 296/26.11, 162, 165, 176

[56] References Cited

U.S. PATENT DOCUMENTS

| | | | |
|---|---|---|---|
| 1,028,100 | 4/1912 | Wolfe | 296/26.1 |
| 2,188,545 | 1/1940 | Smelker | 296/26.11 |
| 2,353,820 | 7/1944 | Eddins | 296/26.11 |
| 2,995,398 | 8/1961 | Davenport | 296/26.1 |
| 3,124,386 | 3/1964 | Jonas | 296/26.1 |
| 3,257,760 | 6/1966 | Calthorpe | 296/26.1 |
| 3,351,373 | 11/1967 | Christin | 296/26.11 |
| 3,708,198 | 1/1973 | Coons | 296/162 |
| 3,937,516 | 2/1976 | Chapman | 296/26.08 |
| 4,065,166 | 12/1977 | Shoemaker | 296/23 G |
| 4,109,954 | 8/1978 | Wall | 296/23 A |
| 4,114,942 | 9/1978 | Greiner | 296/26.11 |
| 4,132,444 | 1/1979 | Beggs | 296/26.11 |
| 4,133,571 | 1/1979 | Fillios | 296/23 C |
| 4,139,229 | 2/1979 | Cooper | 296/26.1 |
| 4,223,939 | 9/1980 | Beggs | 296/26.11 |
| 4,279,440 | 7/1981 | Golding, Sr. | 296/164 |
| 4,294,484 | 10/1981 | Robertson | 296/156 |
| 4,300,797 | 11/1981 | Whitley et al. | 296/164 |
| 4,544,195 | 10/1985 | Gunn | 296/26 |
| 4,858,986 | 8/1989 | Whitley et al. | 296/165 |
| 4,930,837 | 6/1990 | Marsh et al. | 296/165 |
| 5,066,065 | 11/1991 | Baughman | 296/165 |
| 5,358,298 | 10/1994 | Fate | 296/26.11 |
| 5,458,389 | 10/1995 | Young | 296/26.08 |
| 5,468,038 | 11/1995 | Sauri | 296/26.1 |
| 5,628,541 | 5/1997 | Gardner | 296/165 |
| 5,861,991 | 2/1999 | Burns | 296/26.1 |

FOREIGN PATENT DOCUMENTS

| | | | |
|---|---|---|---|
| 2593442 | 7/1987 | France | 296/162 |

*Primary Examiner*—Joseph D. Pape
*Assistant Examiner*—Kiran Patel
*Attorney, Agent, or Firm*—Antony C. Edwards

[57] ABSTRACT

A camper extension includes a rigid frame pivotally mountable, by a pivotable coupling, for example a hinge, onto a camper, so as to be pivotable about a horizontal axis generally bisecting a rear face of the camper, and pivotable between a stowed position inverted over the camper and a deployed position upright and adjacent the rear face, wherein the rigid frame includes floor members defining a floor, generally vertical members defining sides, and roof members outlining a roof opening, the floor members, vertical members and roof members defining an interior cavity sized to receive the camper therein when the frame is pivoted into the stowed position.

10 Claims, 4 Drawing Sheets

Fig 3
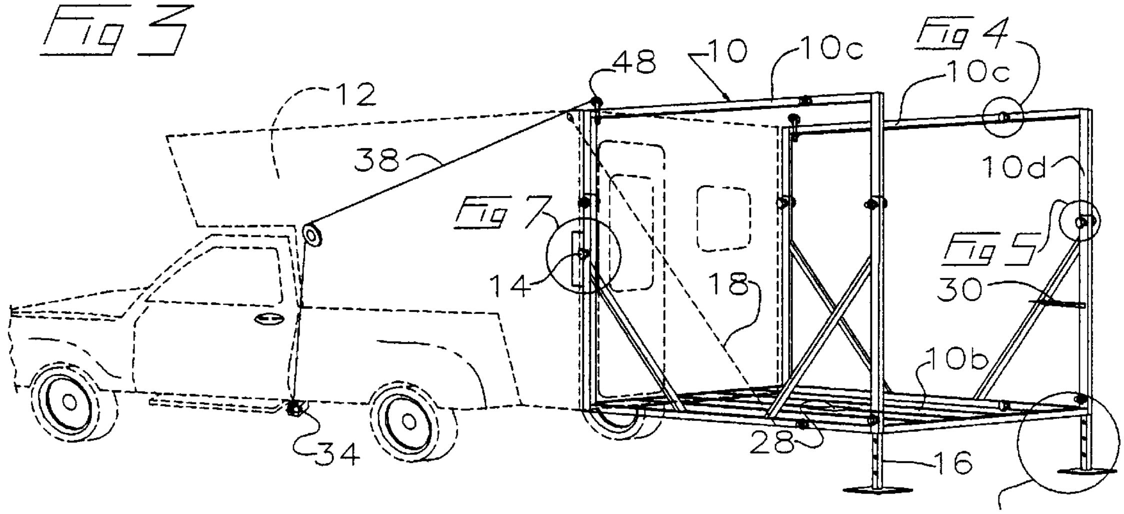
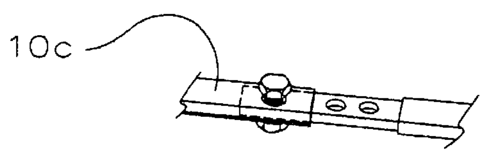
Fig 4
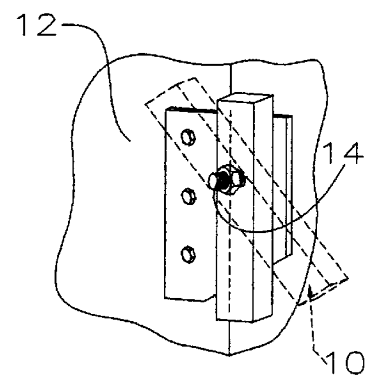
Fig 7
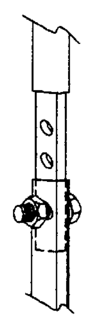
Fig 5
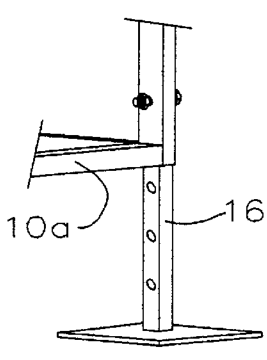
Fig 6

CAMPER EXTENSION

CROSS REFERENCE TO RELATED APPLICATION

This application claims priority from U.S. Provisional Patent Application No. 60/056,266 filed Aug. 29, 1997 titled Camper Extension.

FIELD OF THE INVENTION

This invention relates to the field of accessories for campers of the type mountable into he bed of a pickup truck, and in particular, to a camper accessory which pivots from a stowed posit on inverted over the camper body to a deployed position adjacent the rear of the camper.

BACKGROUND OF THE INVENTION

Campers which are mountable into the beds of pickup trucks so as to provide the amenities of home in remote locations continue to be very popular. In use, it has been an accepted drawback that the interior volume of the camper is somewhat restricted as increasing the size of the camper will quickly exceed the weight restrictions for the vehicle, will increase wind resistance thereby degrading performance of the pickup truck during travel, and, if the camper is merely made longer, exceeds the length of the pickup truck box and acceptable overhang.

Applicant is, however, aware of an attempt to overcome such limitations in the prior art, in particular, U.S. Pat. No. 4,109,954 which issued Aug. 29, 1978 to Wall for an expandable camper apparatus. Wall discloses an expandable camper apparatus for use with a pickup truck, where the apparatus includes a false floor for the pickup truck bed so as to form storage space therebeneath in which is stored a hinged, foldable floor member for a tent. In use, the floor member is removed from the pickup truck bed, unfolded, and becomes the floor of a large tent constructed adjacent to the rear of the pickup truck. An obvious drawback is that, because of the false floor, the camper is elevated in the pickup truck bed, thereby decreasing the stability of the camper. Further, once the floor is deployed, no provision is made for a supporting structure for the tent, so that any supporting structure required by the tent has to be stowed elsewhere, as for example, within the camper.

Applicant is also aware of the following United States patents which relate generally to camper conversions for vehicles, none of which teach nor suggest the deployable frame structure and method of the present invention: U.S. Pat. Nos. 4,065,166; 4,133,571; 4,223,939; 4,279,440; 4,544,195; 4,858,986; and 4,930,837.

SUMMARY OF THE INVENTION

It is an object of the present invention to provide a frame structure which is convenient to carry on a camper and to deploy therefrom so as to provide a simple to use extension to the rear of a camper that effectively doubles the living space of a camper and yet does not suffer from the drawbacks, such as increased instability or complexity displayed in the prior art.

Thus, in summary, the camper extension of the present invention includes a rigid frame pivotally mountable, by a pivotable coupling, for example a hinge, onto a camper, so as to be pivotable about a horizontal axis generally bisecting a rear face of the camper, and pivotable between a stowed position inverted over the camper and a deployed position upright and adjacent the rear face, wherein the rigid frame includes floor members defining a floor, generally vertical members defining sides, and roof members outlining a roof opening, the floor members, vertical members and roof members defining an interior cavity sized to receive the camper therein when the frame is pivoted into the stowed position.

In one aspect of the invention, the frame and interior cavity defined by the floor, vertical, and roof members have sides, a floor and a roof opening all generally rectangular parallelepipeds.

In another aspect, the pivotable coupling is a pair of pinned pivotable hinges mountable, spaced apart along the horizontal axis, to opposite sides of the support frame of the camper and to the rigid frame for pinned pivoting relative motion therebetween about said horizontal axis.

Advantageously, the floor members define a planar floor frame having four corners. The vertical members are mounted at first ends thereof to the four corners, one vertical member of the vertical members per corner. The roof members are mounted to, so as to extend between second ends of the vertical members, the second ends opposite said first ends. The vertical members comprise first and second pairs of vertical members, the first pair of vertical members intersecting the horizontal axis at the pivotable hinges. The pivotable hinges are mounted to the first pair of vertical members. The second pair of vertical members are mounted opposite to the first pair of vertical members on the planar floor frame. Each pivotable hinge, of the pair of pivotable hinges, is mounted to a vertical member of the first pair of vertical members, generally midway along the each vertical member of said first pair of vertical members, at an over-centering location along such vertical members of the first pair of vertical members. The frame rotates to an over-center orientation about the pivotable hinges as the first pair of vertical members are rotated past a generally horizontal orientation.

Further advantageously, a selectively tensionable and de-tensionable non-resilient flexible elongate member is mounted to generally the second end of at least one of the vertical members of the first pair of vertical members. The frame is rotated, by tensioning of the elongate member, so as to rotate the first pair of vertical members through a first angular quadrant, about said horizontal axis, into the generally horizontal orientation, whereby the frame is rotated out of the stowed position. The frame is further rotated by de-tensioning of the elongate member, so as to rotate the first pair of vertical members through a second angular quadrant, contiguous to the first angular quadrant and coplanar therewith, about the horizontal axis, whereby the frame is rotated into the deployed position. The flexible elongate member may be a cable selectively tensionable and de-tensionable by a selectively windable tensioner. The tensioner may include a spool around which the cable is wound and from which the cable is unwound.

In a further aspect of the present invention, the cable is turned around a first tensioning location adjacent a first side of the camper. The first tensioning location lies in a second plane containing the pair of first vertical members when in the generally horizontal orientation. The tensioner is mounted below the camper and the able is turned around a first pulley at the first tensioning location. The tensioner may be a crank mounted adjacent the first side of the camper and the cable is a pair of first and second cables. The first cable passes from the crank around the first pulley to a first side of the first pair of vertical members corresponding to the first side of the camper, and is mounted thereto. The second cable passes from the crank, under the camper, so as to pass from the first side of the camper to a second side of the camper, the second side of the camper opposite the first side of camper. The second cable is turned through second pulleys mounted to the second side of the camper. At least one of the second pulleys is mounted to lie in the second plane, so as to extend the second cable to a second side of the first pair of vertical members, opposite the first side of the first pair of vertical members. The second cable is mounted to the second side of the first pair of vertical members.

BRIEF DESCRIPTION OF THE DRAWINGS

FIG. 3 is, in rear perspective view, the camper extension of FIG. 1 in its deployed position.

FIG. 4 is an enlarged view taken from FIG. 3.

FIG. 5 is an enlarged view taken from FIG. 3.

FIG. 6 is an enlarged view taken from FIG. 3.

FIG. 7 is an enlarged view taken from FIG. 3.

DETAILED DESCRIPTION OF THE PREFERRED EMBODIMENT

Figure 1:
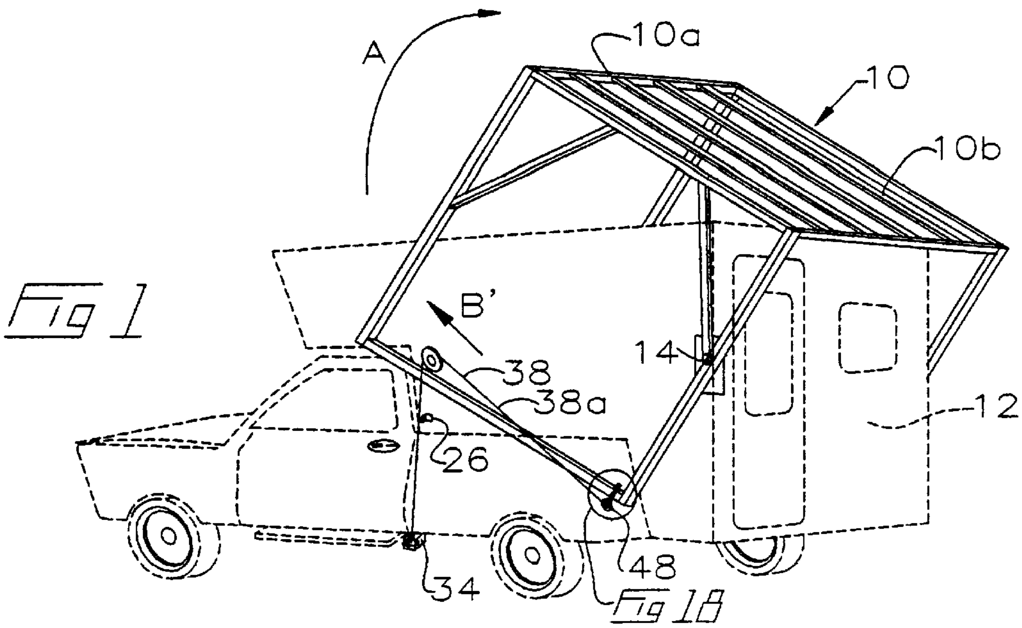
FIG. 1 is, in rear perspective view, the camper extension of the present invention mounted onto a camper wherein the camper extension is partly rotated from its stowed position.
Figure 2:
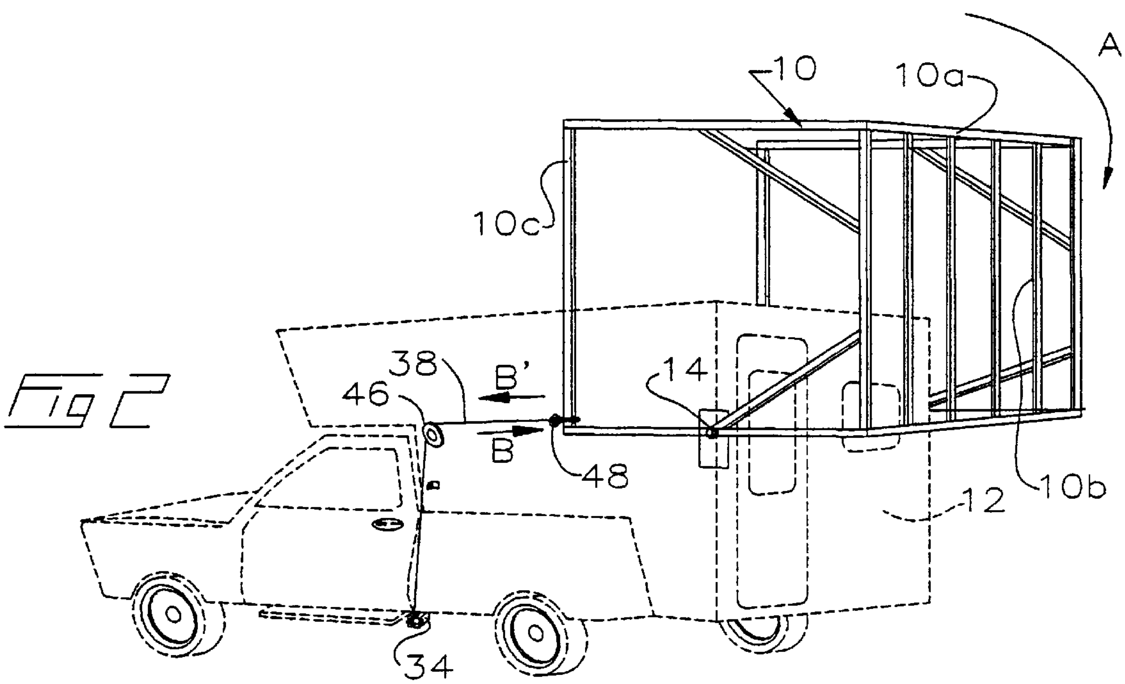
FIG. 2 is, in rear perspective view, the camper extension of FIG. 1 rotated to its over-center position between its stowed position and its deployed position.
Figure 8:
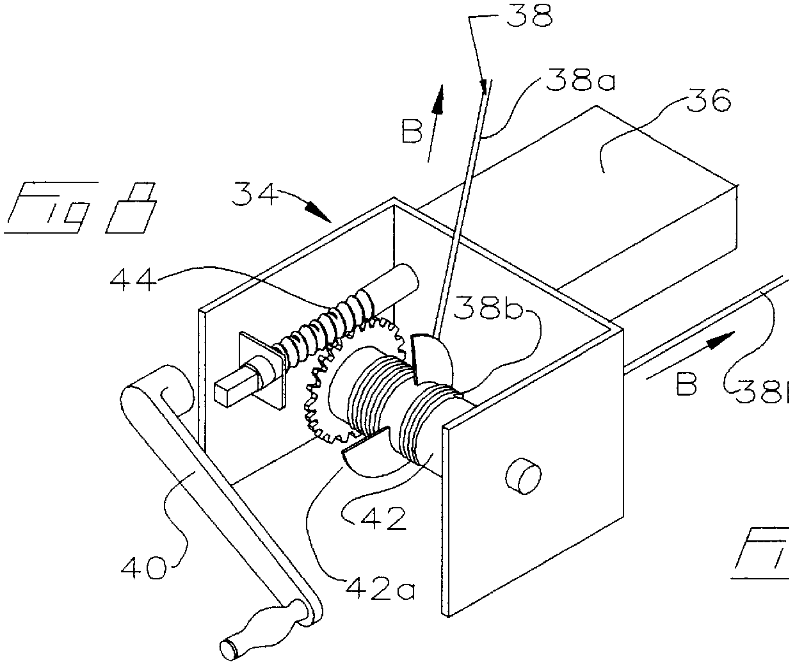
FIG. 8 is an enlarged, partially cut away view of the crank mechanism for effecting rotation of the camper extension of the present invention.

As illustrated, the camper extension of the present invention is a metal frame, which may be advantageously of welded two inch aluminum square tubing, welded into a generally rectangular frame and sized to snugly fit over a camper when the camper is mounted onto pickup truck. FIGS. 1–3 depict how frame 10 is mounted onto camper 12. Frame 10 is shown slightly elevated from stowed position in FIG. 1. Frame 10 may be deployed as seen in FIGS. 2 and 3 by pivoting frame 10 in direction A about pivots or hinges 14 into its fully deployed position seen in FIG. 3. Thus, it should be readily apparent that frame 10 is, in its stowed position, transportable inverted over camper 12. Deploying frame 10 about pivots 14, which are located on opposites sides of the rear of camper 12 mounted securely to the frame of the camper, may be either manually deployed, or preferably, by means of a crank and cable. The crank may be either manually or electrically operated. The crank and cable arrangement and hoisting and deployment method are described in better detail below.

In one preferred embodiment, the vertical members of frame 10 are adjustable in height, as seen in FIGS. 3 and 5, so as to account for the height of roof appliances mounted onto the roof of camper 12. The horizontal members of frame 10, as viewed in FIGS. 3 and 4, are telescopically adjustable so that frame 10 may be telescopically elongated when in its fully deployed position to thereby increase the available space within the cavity defined by the frame of the camper extension, that is frame 10.

Once frame 10 is in the deployed position as seen in FIG. 3, the end 10*a*, being the end furthest aft of camper 12, may be supported by a stand or like rigid members such as adjustable legs 16 pivotally mounted at end 10*a* of frame 10, or, as depicted, telescopically mounted within the vertical frame member and adjustable by means of pins journalled in corresponding holes in the legs and vertical members.

Figure 9:
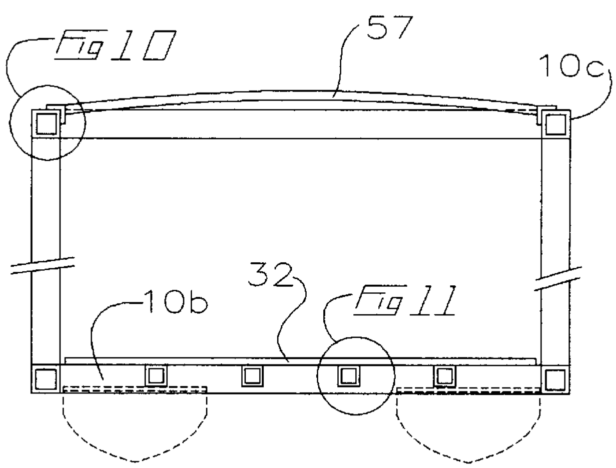
FIG. 9 is, in partially cut away rear elevation view, the camper extension of the present invention in an alternative embodiment.

Frame 10 may be detachable from camper 12 by means of removable couplings such as a removable nut and bolt arrangement at pivots 14 as seen in FIG. 7. If frame 10 is so removed from camper 12, a pair of folding or telescopic legs may be provided along the edge of frame 10 opposite end 10*a* or within the vertical frame members respectively so as to stabilize frame 10 when deployed, independently of camper 12. Releasably mounted pontoons, floats, skids or the like may be mounted horizontal to members 10*b* as seen in FIG. 9 so that when frame 10 is detached from camper 12, it may be used as a pontoon boat, ice-fishing cabin or like recreational enclosure. Pontoons can be added so the unit can be used on water and powered by a small motor, or hauled across the ice by a snowmachine for use when ice-fishing.

As seen in FIG. 3, a detachable chain, or cable, or other non-resilient tether 18 may be mounted at one end to an upper edge of camper 12, and at the opposite end to a horizontal floor member 10*b* of frame 10 to thereby support frame 10 in its deployed position relative to camper 12. Thus, frame 10 while deployed may be transported a short distance while still deployed without dragging on the ground until a supporting member or the legs 16 may be repositioned. As seen in FIG. 3, tether 18 is advantageously mounted to a laterally outermost horizontal floor member 10*b* of frame 10 at least midway longitudinally along the horizontal member.

A roof may be provided by way of a canopy mountable by means of releasable fasteners or the like onto upper horizontal roof members 10*c*. The canopy may be sized to so as to provide a crown to allow rain runoff. Advantageously, the canopy is light and flexible so that it may be rolled up into a small package for easy storage and transportation.

Figure 17:
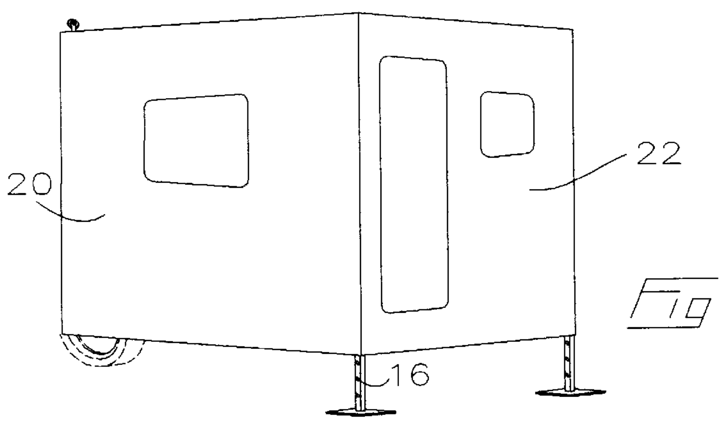
FIG. 17 is, in rear perspective view, the camper extension of the present invention deployed with side and rear coverings mounted thereto.

Side coverings 20 may be provided, which may also be releasably fastenable to frame 10 by means of snaps or the like. Advantageously, the sides may be lightweight and flexible. Plastic windows as seen in FIG. 17 may be provided. A zippered doorway may also be provided either on side coverings 20 or on rear cover 22. Rear cover 22 may, in one embodiment, be a detachable panel releasably mountable onto the rear of frame 10 by means of fasteners, such as hook and loop Velcro™ fasteners or the like in a similar fashion to side coverings 20. In an alternative embodiment, the side and rear panels may be rigid and transported by means of releasable attachment, for example, by hanging, clamping or the like to the rear of camper 12 after frame 10 has been hoisted into its stowed position.

Frame 10 may be accessorised to improve its versatility and ease of transport and use. For example, as seen in FIG. 16, a fairing or wind deflector 24 may be provided which is mountable under the lower front eaves of camper 12, adjacent the cab of the pickup truck so as to deflect wind both around the camper and the leading edge of frame 10 when in its stowed position.

Figure 16:
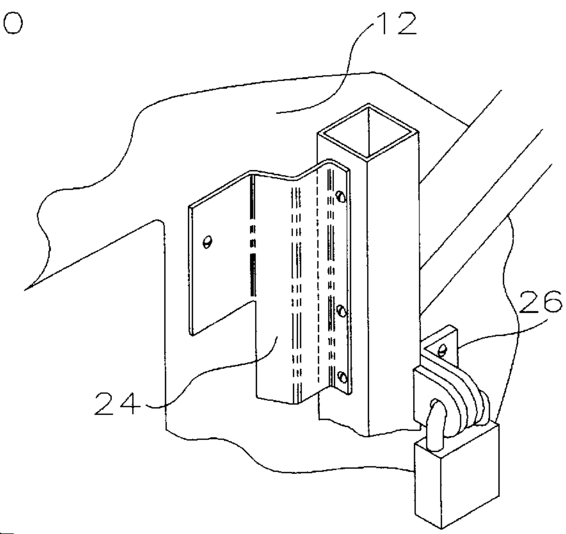
FIG. 16 is, in partially cut away front perspective view, the wind fairing and lockable hold-down mechanism of the camper extension of the present invention.

Padlocks may be used through corresponding flanges 26 mounted to a forward edge of camper 12 and the corresponding location on frame 10 when in the stowed position such as in the location indicated in FIGS. 1 and 16. The padlock prevents unauthorized or unintentional deploying of frame 10 relative to camper 12.

A further accessory may be a table leg bracket, mountable onto the floor of frame 10, that is onto floor members 10*b,* so as to allow the outside use of a camper table. Further, a convenient accessory might be a barbecue shelf which might be mounted to frame 10. Illustrated by way of example in FIG. 3, are table leg bracket 28 mounted to a member 10*b* and barbecue shelf member 30 mounted between the upright supports of frame 10.

Figure 11:
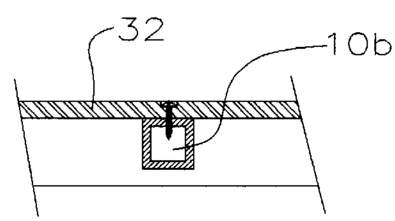
FIG. 11 is an enlarged view taken from FIG. 9.

Flooring 32 seen in FIGS. 9 and 11 may be releasably mounted onto horizontal floor members 10*b*. Flooring 32 may comprise planks, treated cedar strips, aluminum mesh or like lightweight materials. Flooring 32 is thus transported conveniently externally of camper 12 when frame 10 is in the stowed position.

Frame 10 is deployed by rotation in direction A about pivots 14 mounted on either side of camper 12 approximately half-way up the vertical rear face of camper 12. To stow frame 10, frame 10 is raised by rotation, in a direction opposite to direction A, about pivots 14. Deployment and stowing may be accomplished by a single crank 34, seen in FIGS. 1, 2,3 and 8, mounted to the pickup truck frame by means of cross member 36 or like rigid support so as to protrude from the side of the pickup truck. Crank 34 may be mounted so as to pivot under the truck once frame 10 is stowed above camper 12, that is, once cable 38 is de-tensioned.

Cable 38 is comprised of a pair of cables 38*a* and 38*b* wound onto crank 34. Turning handle 40 rotates spool 42 by gearing 44 so as to either wind cables 38*a* and 38*b* onto or off spool 42. Cables 38*a* and 38*b* may advantageously be separated by a divider on spool 42 such as collar 42*a*. Cable 38*a* runs to the side of frame 10 on the port side of camper 12. Cable 38*b* run underneath camper 12 and is turned through, for example, a block and pulley (not shown) mounted to the starboard side of camper 12 so as to attach to frame 10 on its starboard side in a manner similar to the manner of attachment of cable 38*a* to frame 10. Thus, in FIGS. 2 and 8 unwinding the cable, that is, unwinding cables 38*a* and 38*b* off spool 42 in direction B allows frame 10 to lower under its own weight in direction A as the cables are let out, around pulleys 46 mounted on either side of camper 12.

Figure 18:
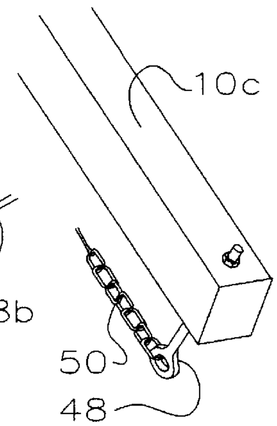
FIG. 18 is, partially cut away, an enlarged view taken from FIG. 1.
Figure 10:
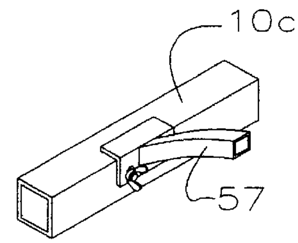
FIG. 10 is an enlarged view taken from FIG. 9.

In operation, starting with frame 10 is in its stowed position handle 40 is turned so as to wind cables 38*a* and 38*b* simultaneously onto spool 42. Cables 38*a* and 38*b* are mounted to laterally opposed upper members 10*c,* for example, by means of eye bolts 48. A length of chain 50, best seen in FIG. 18, may be used for ease of adjustment of the length of cable 38 so that as spool 42 takes up cable 38, frame 10 lifts from its stowed position, as seen in FIG. 1. In FIGS. 1 and 2 winding on of cable 38 onto spool 42 is indicated by tensioning of cable 38 in direction B' (the direction opposite to direction B). As cable 38 brings frame 10 to its balance point over pivots 14, as seen in FIG. 2 that is, when the center of gravity of frame 10 is approximately vertically over pivots 14, frame 10 no longer has to be hoisted by cable 38, but rather is thereafter lowered by cable 38 under its own weight. Thus, after frame 10 pivots to an over-center position, either while being deployed or stowed, hoisting by cable 38 in direction B' is replaced by lowering of frame 10 by cable 38 in direction B.

Figure 12:
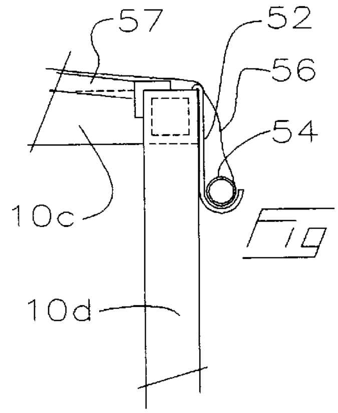
FIG. 12 is, in partially cut away rear elevation view, an upper corner of the camper extension of FIG. 9 with a tarp roof covering and tarp roll holder installed.
Figure 13:
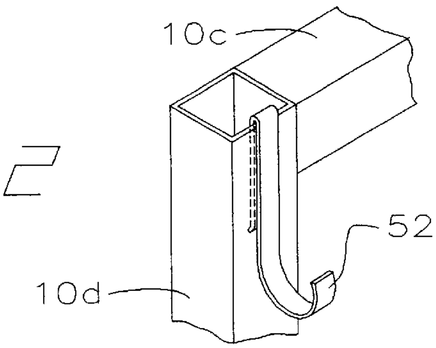
FIG. 13 is, in partially cut away perspective view, the tarp roll holder of FIG. 12 mounted to a vertical member.
Figure 14:
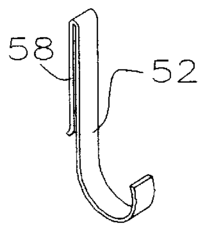
FIG. 14 is, in perspective view, the tarp roll holder of FIG. 13.
Figure 15:
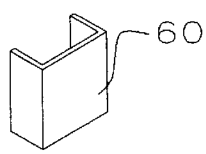
FIG. 15 is, in perspective view, a mounting clip for mounting flexible coverings to the frame of the camper extension of the present invention.

As seen in FIGS. 12–14, curved supporting brackets 52 may be employed to support an elongate tarp hold-down such as pipe 54. A flexible roof cover such as tarp 56 is mounted along its opposed edges to a pair of pipes 54. The weight of pipes 54 may be used to tension the tarp to form a roof covering over frame 10, specifically, over removable rigid roof span members 57, where span members 57 rest on upper members 10*c* and be releasably secured thereon. Such tensioning of the tarp may also be accomplished by rolling tarp 56 onto pipes 54. Such rolling also facilitates storage of tarp 56. Brackets 52 may be clipped into the open uppermost ends of vertical members 10*d* by means of clips 58 on brackets 52. U-shaped channel clips 60 seen in FIG. 15 may be used to fasten flexible coverings, such as further tarps, to frame 10 to form for example side coverings 20.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A camper extension comprising:

a rigid frame pivotally mountable, by a pivotable coupling, onto a camper, so as to be pivotable about a horizontal axis generally bisecting a rear face of said camper, and pivotable between a stowed position inverted over said camper and a deployed position upright and adjacent said rear face, wherein said rigid frame comprises floor members defining a floor, generally vertical members defining sides and mounted to said floor members, and roof members outlining a roof opening and mounted to said vertical members, said floor members, vertical members and roof members defining an interior cavity sized to receive said camper therein when said rigid frame is pivoted into said stowed position.

2. The device of claim 1 wherein said floor members, said vertical members and said roof members define generally rectangular parallelepipeds.

3. The device of claim 1 wherein said pivotable coupling is a pair of pivotable hinges mountable to opposite sides of said camper spaced apart along said horizontal axis, and mountable to said rigid frame for pivoting relative motion between said camper and rigid frame about said horizontal axis.

4. The device of claim 3 wherein said floor members define a planar floor frame having four corners, wherein said vertical members are mounted at first ends thereof to said four corners, one vertical member of said vertical members per corner, wherein said roof members are mounted to, so as to extend between second ends of said vertical members, said second ends opposite said first ends, wherein said vertical members comprise first and second pairs of vertical members, said first pair of vertical members intersecting said horizontal axis at said pivotable hinges, said pivotable hinges mounted to said first pair of vertical members, wherein said second pair of vertical members are mounted opposite to said first pair of vertical members on said planar floor frame.

5. The device of claim 4 wherein each pivotable hinge, of said pair of pivotable hinges, is mounted to a vertical member of said first pair of vertical members, generally midway along said each vertical member of said first pair of vertical members, at an over-centering location along said each vertical member of said first pair of vertical members, wherein said frame rotates to an over-center orientation about said pivotable hinges as said first pair of vertical members are rotated past a generally horizontal orientation.

6. The device of claim 5 wherein a selectively tensionable and de-tensionable non-resilient flexible elongate member is mounted to generally said second end of at least one of said each vertical member of said first pair of vertical members so as to rotate, by tensioning of said elongate member, said first pair of vertical members through a first angular quadrant, about said horizontal axis, into said generally horizontal orientation, whereby said frame is rotated out of said stowed position, and so as to rotate, by de-tensioning of said elongate member, said first pair of vertical members through a second angular quadrant, contiguous to said first angular quadrant and coplanar therewith, about said horizontal axis, whereby said frame is rotated into said deployed position.

7. The device of claim 6 wherein said flexible elongate member is a cable selectively tensionable and de-tensionable by a selectively windable tensioner, said tensioner including a spool around which said cable is wound and from which said cable is unwound.

8. The device of claim 7 wherein said cable is turned around a first tensioning location adjacent a first side of said camper, said first tensioning location lying in a second plane containing said pair of first vertical members when in said generally horizontal orientation.

9. The device of claim 8 wherein said tensioner is mounted below said camper and said cable is turned around a first pulley at said first tensioning location.

10. The device of claim 9 wherein said tensioner is a crank mounted adjacent said first side of said camper and said cable is a pair of first and second cables, wherein said first cable passes from said crank around said first pulley to a first side of said first pair of vertical members corresponding to said first side of said camper, and is mounted thereto, and wherein said second cable passes from said crank, under said camper, so as to pass from said first side of said camper to a second side of said camper, said second side of said camper opposite said first side of camper, and turned through second pulleys mounted to said second side of said camper, at least one of said second pulleys mounted to lie in said second plane, so as to extend said second cable to a second side of said first pair of vertical members, opposite said first side of said first pair of vertical members, said second cable mounted to said second side of said first pair of vertical members.

* * * * *